United States Patent [19]

Eggert et al.

[11] Patent Number: 4,898,810

[45] Date of Patent: Feb. 6, 1990

[54] LAYERS FOR PHOTOGRAPHIC MATERIALS

[75] Inventors: Ute Eggert, Fribourg; Andreas Engel, Binningen; Ekkehard Kramp, Marly, all of Switzerland

[73] Assignee: Ciba-Geigy AG, Basel, Switzerland

[21] Appl. No.: 346,294

[22] Filed: May 1, 1988

Related U.S. Application Data

[63] Continuation of Ser. No. 143,054, Jan. 12, 1988, abandoned.

[30] Foreign Application Priority Data

Jan. 13, 1987 [CH] Switzerland .................... 00097/87-7

[51] Int. Cl.$^4$ .......................... G03C 5/26; G03C 1/00; A23L 1/04

[52] U.S. Cl. .................................... 430/523; 430/531; 430/640; 430/642; 430/905; 430/539

[58] Field of Search ............... 430/531, 905, 640, 642, 430/539, 523; 536/1.1, 114, 119

[56] References Cited

U.S. PATENT DOCUMENTS

| | | | |
|---|---|---|---|
| 2,127,621 | 8/1938 | Staud et al. | 430/640 |
| 3,899,480 | 8/1975 | Kimura et al. | 536/1.1 |
| 4,301,238 | 11/1981 | Miyazawa et al. | 430/642 |
| 4,304,906 | 12/1981 | Kang et al. | 536/119 |
| 4,326,052 | 4/1982 | Kang et al. | 536/1 |
| 4,326,053 | 4/1982 | Kang et al. | 536/1 |
| 4,342,866 | 8/1982 | Kang et al. | 536/119 |
| 4,357,418 | 11/1982 | Cellone | 430/539 |
| 4,377,636 | 3/1983 | Kang et al. | 435/101 |
| 4,410,619 | 10/1983 | Kubbota et al. | 430/531 |
| 4,503,084 | 3/1985 | Baird et al. | 426/573 |
| 4,517,216 | 5/1985 | Shim | 536/1.1 |
| 4,529,797 | 7/1985 | Peik et al. | 536/1.1 |
| 4,535,153 | 8/1985 | Kang et al. | 536/1.1 |
| 4,576,645 | 3/1986 | Ravel et al. | 426/573 |
| 4,638,059 | 1/1987 | Sutherland | 536/121 |
| 4,650,747 | 3/1987 | Uno et al. | 523/351 |
| 4,701,326 | 10/1987 | Nelsen et al. | 424/408 |
| 4,746,528 | 5/1988 | Prest et al. | 536/1.1 |
| 4,816,360 | 3/1989 | Doyle et al. | 430/642 |

OTHER PUBLICATIONS

Sanderson et al., Food Technology, vol. 37, pp. 63–70 (1983).

Sanderson et al., Gums and Stabilizers for the Food Industry, 2, pp. 201–210 (1984).

Jansson et al., Carbohydrate Research, 124 (1983), pp. 135–139.

Gelrite, Thermal-Reversible Gelling Agent, Mar., 1982.

KOA50-Product Data-Kelco, Jan., 1981.

*Primary Examiner*—Ronald W. Griffin

*Attorney, Agent, or Firm*—Wenderoth, Lind & Ponack

[57] ABSTRACT

This invention relates to layers for photographic materials, which comprises a polysaccharide which is formed extracellularly by bacterial fermentation of glucose, maltose, sucrose or xylose, if appropriate in the presence of yeast, yeast hydrolysate or casein-hydrolysate, and with mono-, di- and/or tri-valent metal ions, forms gels having a solidification temperature between 24° and 25° C. Gellan gum has proved to be a particularly advantageous polysaccharide for use in the layers according to the invention.

26 Claims, 2 Drawing Sheets

LAYERS FOR PHOTOGRAPHIC MATERIALS

Figure 1:
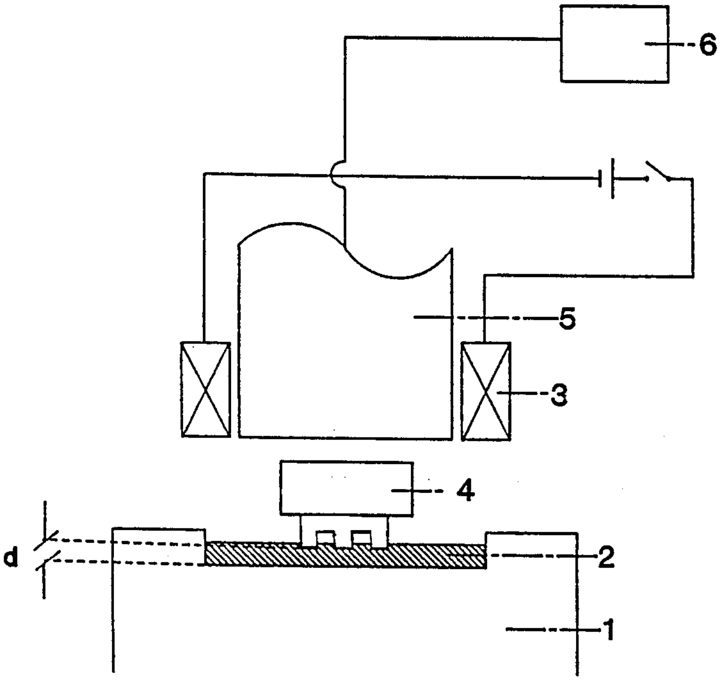

This application is a continuation of now abandoned application Ser. No. 143,054, filed Jan. 12, 1988.

The present invention relates to layers for photographic materials.

Photographic materials usually comprise one or more gelatine-containing layers on a support, at least one of these layers being light-sensitive. In the light-sensitive layers, there are silver halide emulsions, each of which can have been sensitized for light of different wavelengths. In addition to silver halide, these layers may contain further components, depending on the use of the corresponding material, for example color couplers, image dyes or filter dyes.

The light-sensitive layers can be disposed adjacent to light-insensitive gelatine layers, so-called auxiliary layers.

Auxiliary layers in photographic materials are free of light-sensitive components. In most cases they contain only gelatine and, in this form or with suitable additives, for example filter dyes, they can assume the most diverse functions in the material. Depending on the arrangement of the auxiliary layers in the material, they are designated as base layers, interlayers or protective layers.

Auxiliary layers are necessary in photographic materials for various reasons, for example for spatial separation of adjacent light-sensitive layers, for preventing undesired interactions, for promoting adhesion to the support or as protective layers against mechanical damage.

Auxiliary layers, especially base layers, can also be used for eliminating a phenomenon which is called "mottle" and manifests itself in a very troublesome manner in the form of density variations, particularly in homogeneous image areas. In this respect, it is to be noted that polyethylene-coated papers used as supports are as a rule not perfectly plane but have a surface structure. This surface structure is more or less smoothed out by the application of photographic coating solutions and, in this way, causes local differences in the weight applied, which manifest themselves as "mottle" in the processed material. This effect can be suppressed if a thin base layer, which is coated only in the solidified, but not yet dried state with the solutions of the upper layers of the layer assembly, is first applied to the support by the process described in Research Disclosure, November 1984, 24844.

On the other hand, auxiliary layers increase the overall layer thickness of the photographic material, thereby reducing the processing and drying speed. It is therefore advantageous if the thickness of the auxiliary layers can be minimized. For the same reasons, it is also desired to keep the thickness of the light-sensitive layers as small as possible.

However, for reasons of coating technology, it is extremely difficult to prepare such thin layers, since the corresponding coating solutions have a very low viscosity. On the other hand, multi-layer coating processes, such as cascade coating or curtain coating, require a mutually matched viscosity of the various coating solutions which are to be applied simultaneously, since otherwise mixing of the layers takes place or other coating faults arise.

Thin gelatine layers, which are to be coated further in the solidified state by the method described above, easily remelt, for example, whereby their function is of course impaired.

The low gelatine concentration of such coating solutions causes a further problem: the solidification rate of gelatine-containing coating solutions in fact decreases very sharply with decreasing gelatine concentration, and they no longer solidify at all below a critical concentration. This has the result that layers prepared with such coating solutions of very low viscosity are, in the drying step following the coating, blown apart by the air circulating in the drier and therefore show an unacceptable coating quality.

It is therefore an object of the present invention to propose thin layers for photographic materials, which layers, in spite of their low gelatine content, do not differ from the conventional, gelatine-rich layers with respect to the length of the solidification time and to the strength of the gel formed on solidification and which can also be prepared without great effort and without coating problems.

An alternative to the process mentioned in the instruction of mottle suppression is to use coating solutions of extremely high viscosity for the layers determining the image. Although the smoothing step leading to evening-out of the support surface can in this way be repressed to such an extent that it does not interfere with the image, problems which are difficult to solve must instead be accepted, for example problems concerning degassing of the coating solutions. It would therefore be substantially more advantageous to use low-viscosity to medium-viscosity coating solutions which solidify so rapidly that local differences in the weight applied to the surface of structured supports cannot arise.

It is this a further object of the present invention to propose photographic layers which already gel within a very short time on contact with the layer support.

It has now been found, surprisingly, that the said objects can be achieved when specific polysaccharides are used for the preparation of the layers.

The present invention thus relates to layers for photographic materials, which comprise a polysaccharide which is formed extracellularly by bacterial fermentation of glucose, maltose, sucrose or xylose, if appropriate in the presence of yeast, yeast hydrolysate or casein-hydrolysate, and, with mono-, di- and/or tri-valent metal ions, forms gels having a solidification temperature between 24° and 45° C.

The invention also relates to the use of these polysaccharides in layers, especially in auxiliary layers of photographic materials, to photographic materials containing these layers and also to a process for increasing the solidification rate of gelatine-containing photographic layers.

The polysaccharides which can be used according to the invention can be obtained by means of the said carbohydrates, if appropriate in the presence of the likewise mentioned nitrogen sources. Both with monovalent and with di- and/or tri-valent metal ions, preferably alkali metal ions and alkaline earth metal ions such as $Li^{+}$, $Na^{+}$, $K^{+}$, $Mg^{2+}$, $Ca^{2+}$, $Sr^{2+}$ and $Ba^{2+}$ and also $B^{3+}$ and $Al^{3+}$ and transition metal ions such as $Zn^{2+}$, $Cu^{2+}$ and $Ni^{2+}$, they form gels, the mechanical strength (gel strength) of which can be varied within wide limits by the particular composition of the corresponding coating solution. This also applies to the solidification temperature of the coating solution, which is between 30° and 45° C. according to the invention, i.e. markedly higher than is typical for gelatine solutions (12° to 25° C.). After passing below the solidification temperature—with a sufficiently high metal ion concentration—such gel strengths are already found after gelling times of up to about 5 seconds which can only be achieved with gelatine solutios after considerably longer times (more than 10 seconds), if at all.

The pronounced ability of the coating solutions according to the invention to form gels rapidly at a temperature markedly higher than in the case of gelaine solutions is preserved, surprisingly, even if comparatively large quantities of gelatine or other coating solution components such as silver halide emulsions, image dyes, color couplers, UV absorbers, hardeners and the like are added to the polysaccharide.

Gellan gum has proved to be a particularly advantageous polysaccharide for use in the layers according to the invention. Gellan gum is a polysaccharide known from the literature, which is obtained by aerobic biological degradation of a suitable fermentation medium by means of *Pseudomonas elodea.* The preparation and characterization of gellan gum and its use in the food industry have been described, for example, in U.S. Pat. Nos. 4,326,052, 4,326,053 and 4,503,084, Carbohydrate Research 124 (1983), pages 135 to 139, Food Technology, vol. 37, April 1983, pages 63 to 70 or Gum and Stabilizers for the Food Industry, 2(1984), pages 201 to 210. There are no references to a photographic use in these publications.

For the present invention, only the deacetylated form of gellan gum is of importance, which is marketed, for example, as GELRITE or K3A 123 by Merck & Co., Inc., Kelco Division, USA. Preferably, the clarified deacetylated form of gellan gum is used.

A further suitable polysaccharide is the fermentation product termed XM-6 in US-A-4,638,059. The preparation and properties of this polysaccharide are mentioned in this patent specification. However, any references to a photographic application are lacking.

Coating solutions containing gellan gum show, depending on the concentration of this polysaccharide relative to other components in the coating solutions, a pronounced solidification hysteresis, i.e. the melting or remelting temperature of the gel, which as a rule is above 70° C., is markedly higher than the solidification temperature. By contrast, coating solutions containing XM-6 show a thermo-reversible behavior.

To produce the layers according to the invention, the polysaccharide is preferably used in the form of aqueous solutions. The concentrations of these solutions are preferably 0.05 to 2.0 and especially 0.1 to 1.0 percent by weight. The solidification rate, solidification temperature and remelting temperature can be regulated within a wide range by means of ions of mono-, di- and/or tri-valent metals such as $Li^+$, $Na^+$, $K^+$, $Mg^{2+}$, $Ca^{2+}$, $Ba^{2+}$, $Sr^{2+}$, $B^{3+}$, $Al^{3+}$, $Zn^{2+}$, $Cu^{2+}$ and $Ni^{2+}$. In general, 2 to 40 mmol of monovalent metal salts or 0.05 to 5 mmol of di-valent metal salts or 0.02 to 0.2 mmol of trivalent metal salts can be added per 100 g of aqueous solution.

In place of the polysaccharide alone, its mixtures with gelatine can, if desired, also be used in the preparation of photographic layers. Preferably, the polysaccharide and gelatine are then present in a weight ratio of 2:1 to 1:150, in particular 2:1 to 1:70 and especially 1:2 to 1:50. The solidification and remelting temperatures of such solutions depend on the concentration of gelatine and polysaccharide and on the concentration and nature of the added metal ions.

The additives known from the state of the art, for examle the wetting agents known from Research Disclosure, December 1978, 17,643, XI, can also be added to the coating solutions.

The layers which can be produced with these coating solutions can have a very small dry layer thickness. Layers having dry layer thicknesses from 0.05 to 2 and especially from 0.05 to 1.00 μm are of great importance in many cases. Such layers are particularly suitable as base layers in photographic materials, preferably silver dye bleach materials. Gellan gum has proved particularly suitable for the use in base layers of silver dye bleach materials.

For producing layers having very small dry layer thicknesses, coating solutions are suitable which have a gelatine concentration from 0 to 1.5 percent by weight. As shown by Example 4, they very rapidly form gels of remarkably high strength, whereas corresponding solutions without polysaccharide do not gel even during a very long waiting time and are therefore useless.

The polysaccharides which can be used according to the invention also allow the preparation of coating solutions which solidify immediately after contact with an uncoated or already coated support. For this purpose, the mixing temperature, which is instantaneously established when the warm coating solution is applied to the cold support, must be below the solidification temperature of the coating solution. Moreover, the coating solution must be capable of solidifying very quickly. The mixing temperature is determined by the initial temperature and heat capacity of the film support, which may have been precoated, and by the initial temperature, applied quantity and specific heat of the coating solution. If, for example, 20° to 25° C. for the initial temperature of the film support and 40° C. for that of the coating solution are chosen, the mixing temperatures are approximately between 27° and 35° C. under the conditions of, for example, multi-cascade coating. The solidification temperature of the coating solution should therefore be brought into the range from 28° to 38° C., for example by means of metal ions. By means of cooling of the layer support upstream of the first coating station, the applied quantity can be increased without raising the mixing temperature. Appropriate coating solutions preferably contain mixtures of polysaccharide and gelatine.

Layers of polysaccharide and mixtures of polysaccharide and gelatine show good adhesion to the supports conventional in photography, such as are described, for example, in Research Disclosure, December 1978, 17,643, XVII. They also show good compatibility with gelatine layers.

By reaction with the hardeners conventional in photography, which are summarized, for example, in Research Disclosure, December 1978, 17,643, X, the swelling factor, which is about 8 to 10 without hardening, can be reduced to values from 2 to 4. On the other hand, the layers according to the invention in the unhardened or partially hardened state can also contribute to an increase in the swelling volume of the material.

In the simplest case, photographic material according to the present invention comprises, on a support, at least one light-sensitive layer containing one of the said polysaccharides. Further light-sensitive layers and also auxiliary layers can likewise contain a polysaccharide. Materials which contain the said polysaccharide only in auxiliary layers are likewise photographic materials according to the present invention. In this context, photographic material can be understood as meaning all conventional photographic materials, for example chromogenic materials, dye diffusion transfer materials and especially silver dye bleach materials.

The preferred photographic material according to the present invention is a silver dye bleach material which comprises, on a support, at least one light-sensitive layer, at least one layer containing a bleachable image dye and at least one layer according to the invention as an auxiliary layer or at least one light-sensitive layer containing a bleachable image due and at least one layer according to the invention as an auxiliary layer. Preferably, the auxiliary layer in such materials is a base layer.

In the examples which follow, the solidification properties of the coating solutions used for producing the layers according to the invention are described. The figures belonging to the examples relate to:

FIG. 1: Measuring apparatus for determining the solidification rate and gel strength FIG. 2: Solidification temperature of a mixture of gellan gum and gelatine as a function o the potassium ion concentration FIG. 3: Dependence of the gel strength on the cooling time at super-cooling by 4.5°, 9.5° and 27° C. for a gelatine solution containing 0.15 g of gellan gum/100 g of solution.

Figure 4:
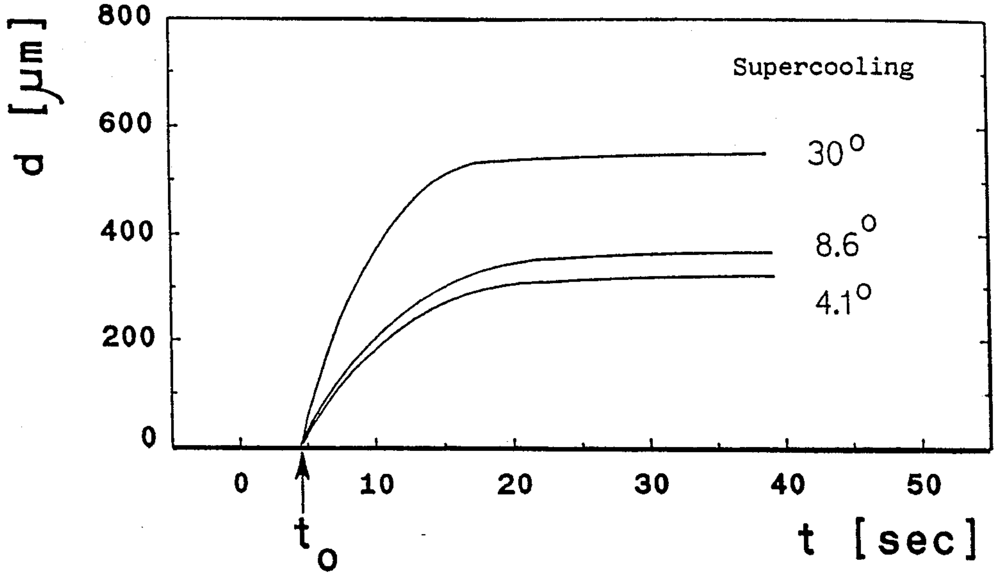

FIG. 4: Dependence of the gel strength on the cooling time at super-cooling by 4.1°, 8.6° and 30° C. for a gelatine solution containing 0.30 g of gellan gum/100 g of solution.

To determine the solidification rate and gel strength, 500 μl of the solution to be tested are brought, according to FIG. 1, into the measuring cell (2) of 2×2 $cm^2$ base area, which is made of brass and can be temperature-controlled by means of PELTIER cooling or heating (1). The temperature of the 1250 μm thick solution layer is measured by means of a calibrated thermocouple. At time t=o, the set temperature is lowered from its initial value (40° or 45° C.) to the desired end value (7.5° C. as a rule). After a-symmetrically varied-waiting time t, a test body of iron (base area 0.5 $cm^2$, mass 2.7 g) (4), which up to then has been held by a magnet coil (3) in its rest position at $d_o$=1450 μm and which is thermally insulated on the underside by a layer of polyacrylate glass, is allowed to drop onto the gel being formed. The resulting position d above the cell bottom is detected by means of an inductively operating distance sensor (5) and recorded-together with the actual temperature—by a two-pen recorder (6). The higher the end position above the bottom surface of the cell, the greater is the gel strength: d is thus a direct measurement of the gel strength.

When the solution temperature is taken back to the initial value, it will be seen directly whether and, if so, at what temperature the gel can be remelted. If, on the other hand, the cooling time is maintained at a fixed value of about 10 seconds, the temperature limit, at which the position d starts to deviate from zero, i.e. where the gelling process starts, can be determined by systemically varying the particular set temperature.

The examples which follow explain the invention without limiting it thereto.

EXAMPLE 1

Preparation of a base layer of gellan gum, having a dry layer thickness of 0.12 μm.

To prepare a photographic material for the silver dye bleach process, the following layers are applied to a polyethylene-coated paper support: a base layer which, per $m^2$, contains 0.12 g of GELRITE and 30 mg of magnesium sulfate, a red-sensitive layer which, per $m^2$, contains 1.20 g of gelatine and 0.30 g of silver as a silver bromoiodide emulsion with 2.6 mol % of iodide and 140 mg of the cyan dye of the formula (100)

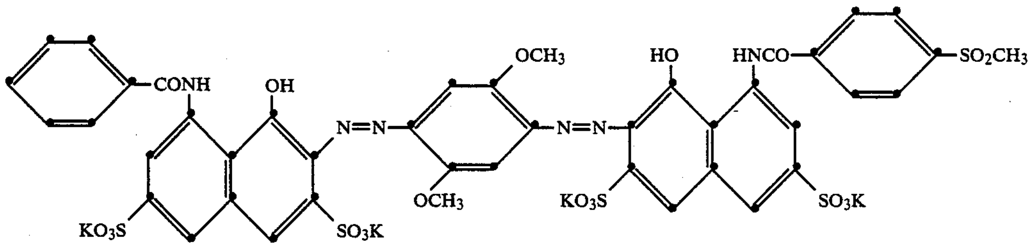

a gelatine interlayer of 1.5 $g/m^2$ of gelatine, a green-sensitive layer which, per $m^2$, contains 2.00 g of gelatine, 0.27 g of silver as a silver bromoiodide emulsion with 2.6 mol % of iodide and 162 mg of the magenta dye of the formula (101)

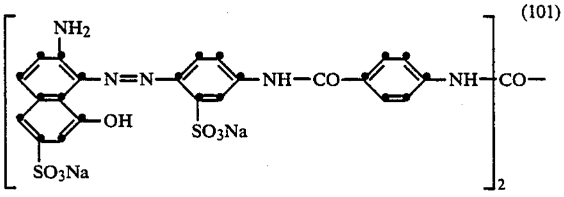

a yellow filter layer of 0.04 $g/m^2$ of colloidal silver and 0.054 $g/m^2$ of the yeloow dye of the formula

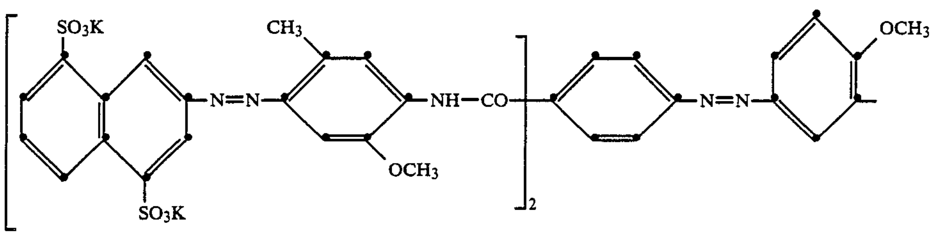

(102)

a blue-sensitive layer which, per $m^2$, contains 0.90 g of gelatine, 0.22 g of silver as a silver bromoiodide emulsion with 2.6 mol % of iodide and 80 mg of the dye of the formula (102), and a protective gelatine layer of 0.8 $g/m^2$ of gelatine.

In addition, the material contains 100 $mg/m^2$ of 2,4-dichloro-6-hydroxytriazine a a gelatine hardener.

The material is exposed in the usual manner behind a step wedge and processed as follows:

| | |
|---|---|
| development | 1.5 minutes |
| washing | 0.5 minutes |
| silver and dye bleach | 1.5 minutes |
| washing | 0.5 minutes |
| fixing | 1.5 minutes |
| washing | 3.0 minutes |
| drying | |

The temperature of the respective baths is 30° C.

The developer bath contains the following components per liter of solution:

| | |
|---|---|
| sodium sulfite | 38.0 g |
| potassium sulfite | 19.9 g |
| lithium sulfite | 0.6 g |
| 1-phenyl-3-pyrazolidinone | 1.0 g |
| hydroquinone | 12.0 g |
| potassium carbonate | 29.1 g |
| potassium bromide | 1.5 g |
| benzotriazole | 0.5 g |
| sodium ethylenediaminetetra-acetate | 4.0 g |

The dye bleach bath has the following composition per liter of solution:

| | |
|---|---|
| concentrated sulfuric acid | 56.3 g |
| sodium m-nitrobenzenesulfonate | 6.0 g |
| potassium iodide | 8.0 g |
| hydroxyethylpyridinium chloride | 2.4 g |
| 2,3-dimethylquinoxaline | 2.5 g |
| 4-mercaptobutyric acid | 1.8 g |

The fixing bath contains, per liter of solution:

| | |
|---|---|
| ammonium thiosulfate | 200 g |
| ammonium bisulfite | 12 g |
| ammonium sulfite | 39 g |

This gives a positive image of the exposed gray wedge with good contrast balance. There is very good adhesion between the support and the photographic element.

EXAMPLE 2

Preparation of a base layer from a mixture of gellan gum and gelatine, having a dry layer thickness of 1.00 μm.

A photographic element is prepared according to Example 1, but with the difference that it contains a base layer of 0.88 $g/m^2$ of gelatine, 0.12 $g/m^2$ of GELRITE and 30 $mg/m^2$ of magnesium sulfate.

The material is exposed and processed as indicated in Example 1. Similarly good images as in Example 1 are obtained.

EXAMPLE 3

Solidification properties of gelatine solutions free of additives (comparison example).

The solidification time, the solidification temperature and the maximum gel strength of aqueous solutions of a commercially available bone gelatine are measured by means of the apparatus described in FIG. 1 at pH 5.7 and at concentrations between 1 and 6%. The results are compiled in Table 1.

TABLE 1

| Gelatine concentration [%] | Solidification time [$t_E$ (sec)] | Solidification temperature [$T_E$ (°C.)] | Max. gel strength [d (m)] |
|---|---|---|---|
| 3.0 | 15.0 | 12.5 | 320 |
| 3.5 | 15.0 | 14.5 | 400 |
| 4.0 | 7.5 | 16.3 | 500 |
| 5.0 | 3.0 | 18.8 | >600 |
| 6.0 | 3.0 | 20.9 | >600 |

Table 1 shows that the solidification time decreases with increasing gelatine concentration, but the solidification temperature and the maximum gel strength increase. Gelatine solutions of a concentration of less than 1.5% of gelatine no longer solidify under the given conditions.

The gels formed on cooling remelt very easily: the shorter the solidification time $t_E$, the lower is the remelting temperature $T_{rem}$. Typical values of $T_{rem}$ are between 8° and 23° C.

EXAMPLE 4

Coating solutions according to the invention for the preparation of thin base layers, the coating solutions containing gellan gum.

Varying concentrations of metal salts are added to 0.5% of an aqueous solution of gellan gum, and the solidification temperature ($T_E$) and maximum gel strength (d) are examined as in Example 3: the nature and concentration of the metal salt and the corresponding measured results are reproduced in Table 2.

TABLE 2

| Salt concentration (mmol/100 g of solution) | NiSO4 $T_E$ (°C.) | CuSO4 $T_E$ (°C.) | ZnSO4 $T_E$ (°C.) | Ca(NO3)2 $T_E$ (°C.) | Ba(NO3)2 $T_E$ (°C.) | Ba(NO3)2 d (μm) | MgSO4 $T_E$ (°C.) | MgSO4 d (μm) |
|---|---|---|---|---|---|---|---|---|
| 0.10 | 31.0 | 31.0 | 32.3 | 31.0 | — | 400 | — | — |
| 0.15 | 34.3 | 35.0 | 35.3 | — | 33.1 | 420 | — | — |
| 0.20 | 37.8 | 39.5 | 38.2 | 34.4 | 35.0 | 700 | 30.0 | 100 |
| 0.25 | 41.0 | — | 41.0 | — | 37.1 | 700 | 33.5 | 340 |
| 0.30 | — | — | — | 37.8 | 38.7 | — | — | — |
| 0.35 | — | — | — | — | 40.4 | 730 | — | — |
| 0.50 | — | — | — | — | — | — | 39.5 | 730 |

The values in Table 2 show that all the solutions reach a gel strength which is obtained in Example 3 only at higher gelatine concentrations. Depending on the salt and the concentration of this salt, the solidifi-cation temperatures are between 30° and 40° C. In spite of the low concentration of gellan gum, the solidification times are shorter than three seconds, and in some cases even shorter than one second.

The gels formed from the above solutions no longer remelt below 45° C.

Similar results are obtained when corresponding aqueous solutions of the polysaccharide XM-6 are used in combination with the said metal salts. However, the gels thus obtained are thermo-reversible.

EXAMPLE 5

Coating solutions according to the invention for preparing thin base layers, the coating solutions containing a mixture of gellan gum and gelatine.

The procedure followed is as described in Example 4, but with the difference that aqueous solutions containing 1% of a bone gelatine and 0.4% of gellan gum with varying metal salt additions are used. The results are compiled in Table 3.

TABLE 3

| Barium nitrate concentration (mmol/100 g of solution) | $T_E$ (°C.) | d (m) |
|---|---|---|
| 0.15 | 33.5 | 430 |
| 0.20 | 35.0 | 560 |
| 0.25 | 36.8 | 640 |

The values in Table 3 show that all the solutions reach a gel strength which is obtained only at gelatine concentrations above 3.5% in Example 3. Depending on the salt and the concentration of this salt, the solidification temperatures are between 30° and 40° C. In spite of the low concentration of gellan gum, the solidification times are shorter than three seconds, and in some cases even shorter than one second.

The gels formed from the above solutions no longer remelt below 45° C.

Similar results are obtained when corresponding aqueous solutions of the polysaccharide XM-6 are used in combination with the said metal salt. However, the gels thus obtained are thermo-reversible.

EXAMPLE 6

Reduction of the mottle effect.

To prepare photographic material for the silver dye bleach process, the following layers are applied to a polyethylene-coated paper support at coating stations 1 and 2 which are separated from one another by a solidification zone:

Coating station 1: a base layer in variants a, b or c (see below)

Coating station 2: a red-sensitive layer, a gelatine interlayer, a green-sensitive layer, a yellow filter layer, a blue-sensitive layer and a protective gelatine layer These layers have the following composition:

Base layer,

- variant a: contains, per $m^2$, 0.54 g of gellan gum (K3A 123) and 60 mg of barium nitrate
- variant b: contains, per $m^2$, 0.48 g of gellan gum, 1.2 g of gelatine and 60 mg of barium nitrate
- variant c: contains, per $m^2$, 0.54 g of gellan gum and 21 mg of nickel sulfate In a fourth material variant d, the base layer is entirely omitted.

The red-sensitive layer contains, per $m^2$, 1.20 g of gelatine and 0.30 g of silver as a silver bromoiodide emulsion with 2.6 mol % of iodide and 153 mg of the cyan dye of the formula (103)

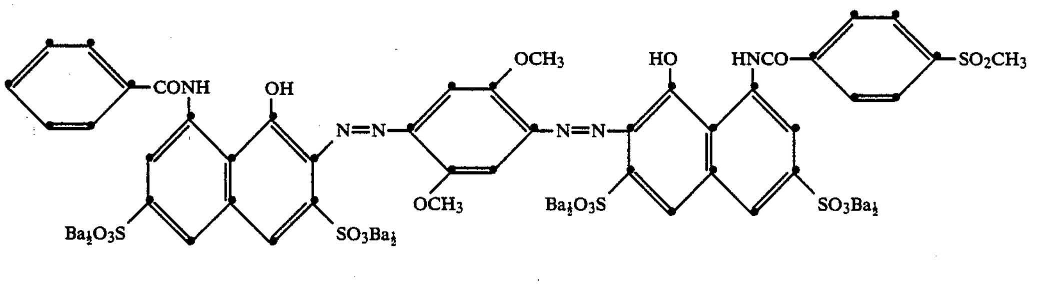

The gelatine interlayer consists of 1.5 g/$m^2$ of gelatine.

The green-sensitive layer contains, per $m^2$, 2.00 g of gelatine, 0.27 g of silver as a silver bromoiodide emulsion with 2.6 mol % of iodide and 186 mg of the magenta dye of the formula

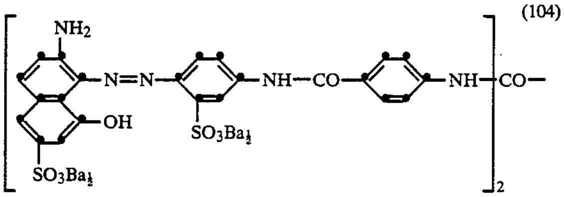

(104)

The yellow filter layer contains 0.04 $g/m^2$ of colloidal silver and 0.059 $g/m^2$ of the yellow dye of the formula

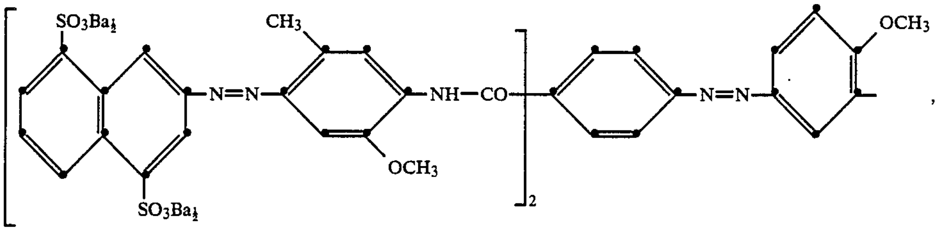

(102)

The blue-sensitive layer contains, per $m^2$, 0.90 g of gelatine, 0.22 g of silver as a silver bromoiodide emulsion with 2.6 mol % of iodide and 87 mg of the dye of the formula (105).

The protective gelatine layer consists of 0.8 $g/m^2$ of gelatine.

In addition, the material contains, in the base layer, 19 (variants a and c) or 29 $mg/m^2$ (variant b) and, in the remaining layers, a total of 100 $mg/m^2$ of 2,4-dichloro-6-hydroxytriazine (potassium salt) as a gelatine hardener. The pH of the solution is 6.5 throughout.

The base coating solutions, coated at 45° C., have a viscosity of 5.6 (variants a and c) or 7.4 mPa.s (variant b) at 40° C., the solidification temperature is 34.5° C. for variants a and b and 31.5° C. for variant c. The result of preheating the uncoated support to about 30° C. and of a sufficient distance between the first coating station and the subsequent, abovementioned solidification zone is that the temperature of the coated web remains above 39° C. for a period of 1.5 to 2 seconds, so that the coated base layer solution retains a low viscosity before the solidification starts as a result of cooling down to 7° C.

For characterizing their mottle effect, large-area samples of the finished material are subjected to homogeneous gray exposure and processed as described in Example 1.

The extent of the mottle effect resulting after processing is visually assessed by ratings from 1 to 6. Rating 1 here corresponds to a completely homogeneous image impression and rating 6 corresponds to a highly inhomogeneous image impression. Rating 6 would signify entirely useless results, whereas ratings between 2 and 4 correspond to quite acceptable results.

Variants a to c give mottle ratings between 2.5 and 3.5 (weak mottle), and reference sample d gives a mottle rating of 5.5 (very strong mottle), see Table 4.

TABLE 4

| Variant | Mottle rating |
|---|---|
| a | 3.0 |
| b | 3.5 |
| c | 2.5 |
| d | 5.5 |

EXAMPLE 7

Use of gellan gum in combination with a gelatine hardener.

Three layers are prepared on a transparent support:

Layer a consists, per $m^2$, of 1 g of gellan gum. Layer b consists, per $m^2$, of 1 g of gellan gum and 2 mg of the potassium salt of 2,4-dichloro-6-hydroxytriazine as a hardener. Layer c consists, per $m^2$, of 1 g of gellan gum and 4 mg of the potassium salt of 2,4-dichloro-6-hydroxytriazine.

First the dry layer thickness and then the thickness of the layer swollen with water is measured on microscopic thin layers. The swelling factors resulting from this are shown in Table 5. The reduced swelling due to the hardener is clearly evident.

TABLE 5

| Layer | Swelling factor |
|---|---|
| a | 11.0 |
| b | 5.0 |
| c | 3.7 |

EXAMPLE 8

Coating solutions of higher concentration, suitable for auxiliary layers, with modified solidification properties.

Aqueous solutions, adjusted to pH 6.5, of the following composition are prepared:

| | | |
|---|---|---|
| (a) | gelatine | 8.5 g per 100 g of solution |
| | gellan gum | 0 or 0.3 g per 100 g of solution |
| | potassium nitrate | content varies between 1 and 3 mmol per 100 g of solution |
| (b) | gelatine | 5.0 g per 100 g of solution |
| | barium nitrate | 0.23 mmol per 100 g of solution |
| | gellan gum | 0.15 or 0.30 g per 100 g of solution |

(c) as b; however, XM-6 is used in quantities of between 0.1 and 0.3 g per 100 g of solution instead of gellan gum (d) as b; however, dextran sulfate is used, namely 0.5 g per 100 g of solution, instead of gellan gum. (Dextran sulfate is a compound which is known from U.S. Pat. No. 3,762,924 and which increases the solidification temperature of aqueous gelatine solutions.)

(e) as b; however, the coating solution additionally also contains a UV absorber emulsion according to RD 27,832, namely 1.0 g per 100 g of solution

| | | |
|---|---|---|
| (f) | gelatine | 8.5 g per 100 g of solution |
| | barium nitrate | 0.75 mmol per 100 g of solution |
| | gellan gum | 0.085 g per 100 g of solution |

and the solutions are examined for their solidification characteristics in the way described above.

Figure 2:
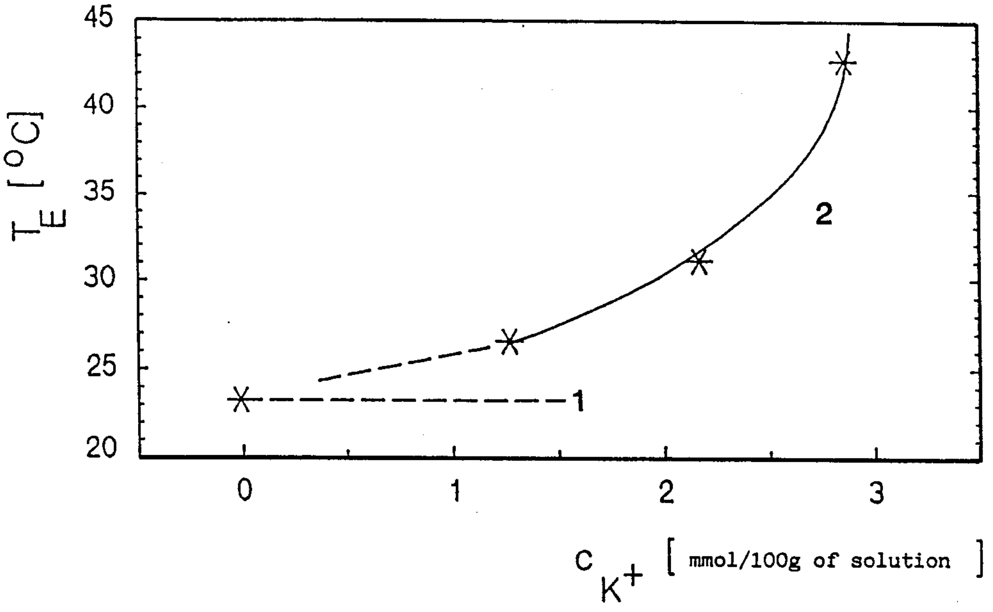
Figure 3:
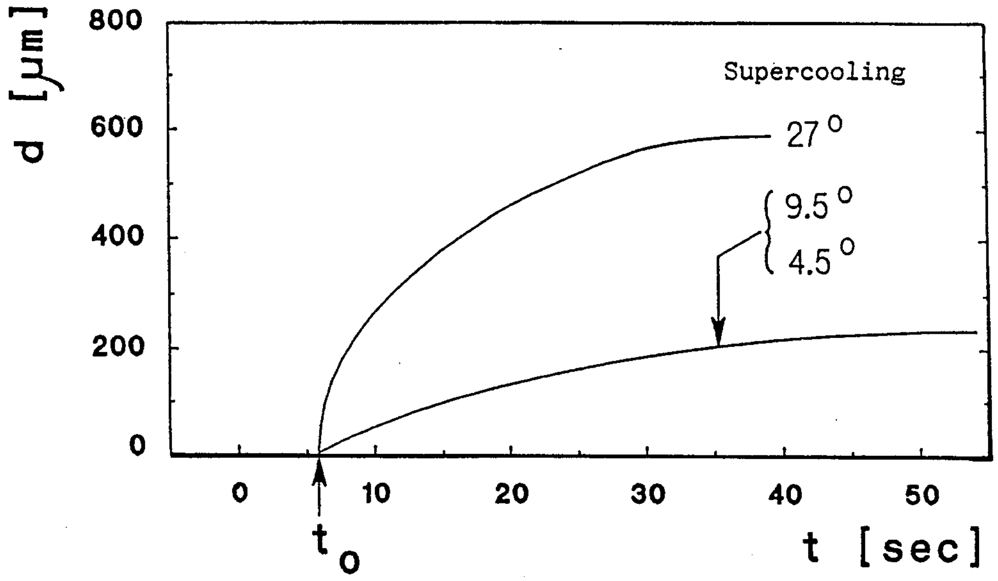

As FIG. 2 shows for the example of gellan gum, the solidification temperature $T_E$ of the solutions according to the invention can be shifted between 23° and 45° C. by appropriate selection of the cation concentration (variants a and b). When cooled to below their solidification temperature, the said solutions solidify rapidly, and in particular within one second at adequate polysaccharide and salt contents. This applies even if the supercooling reaches only 4° C., so that the end temperature remains far above the range (10°-24° C.) typical of pure gelatine solutions. FIGS. 3 and 4 show the dependence of the gel strength d on the cooling time t for various temperatures of supercooling, $t_o$ being that time which is required to cool the sample to the solidificatin temperature $T_E$. The gel strength reached under only slight supercooling remains markedly below the maximum obtainable value. However, it still corresponds to the gel strength of a 3% gelatine solution which has been held for 30 seconds at 7° C.

Similar results are obtained if gellan gum is replaced by XM-6 (variant c). By contrast, if the dextran sulfate described, for example, in U.S. Pat. No. 3,762,924 is used (variant d), the viscosity rises to extremely high values (950 mPa.s at 40° C.—usual viscosities for multiple coating are below 100 mPA.s), whereas the solidification temperature rises only slightly—from 18° to 25° C. On the other hand, it is immaterial whether the gelatine solution is free of special layer additives or contains additives typical of auxiliary layers, for example UV absorber emulsions: solution e does not differ from solution b with respect to its solidification behavior.

When the layers prepared from the coating solutions according to the invention are reheated, characteristic differences compared with pure gelatine gels are found: pure gelatine solutions completely remelt again at relatively low remelting temperatures; they are therefore very sensitive to the air circulating in the drier. By contrast, the layers according to the invention almost completely retain their original strength at temperatures of 25° to 30° C. Such layers can therefore be dried at relatively high temperatures, without incipient melting stripes being formed.

This applies even if the polysaccharide quantity is reduced to one hundredth part of the gelatine quantity (variant f). Even in this case, a marked increase in the solidification temperature up to 39° C., a short solidification time (about 1 second) and a remarkable resistance of the gel layers formed to remelting are detectable: after heating to 40° C., their gel strength at a d value of 300 μm still remains at a level which corresponds to the maximum strength of a 3% gelatine gel (in this connection, compare Table 1 from Example 3) reached at a low temperature (5° C.).

EXAMPLE 9

Emulsion-containing coating solutions having modified solidification properties.

The coating solutions described below are prepared.

Coating solutions for the silver dye bleach process.

(a) 100 a of a red-sensitive coating solution batch contain 4 g of gelatine, 0.58 g of silver as a sensitized and stabilized silver bromo-iodide emulsion with 2.6 mol % of iodide, 306 mg of the cyan dye described in Example 6, 60 mg of barium nitrate and gellan gum additions of between 0 and 0.4 g. The pH is 6.5 in each case.

(b) 100 g of a blue-sensitive solution batch, likewise adjusted to pH 6.5, contain 3.8 g of gelatine, 0.89 g of silver as a sensitized and stabilized silver bromoiodide emulsion with 2.6 mol % of iodide, 365 mg of the yellow dye represented in Example 6, 60 mg of barium nitrate and gellan gum additions of between 0 and 0.4 g.

(c) 100 g of a green-sensitive solution batch, adjusted to pH 6.5, contain 5.2 g of gelatine, 0.52 g of silver as a sensitized and stabilized silver bromoiodide emulsion with 2.6 mol % of iodide, 402 mg of the magenta dye represented in Example 6, 0.15 g of gellan gum and 108 mg of the potassium salt of 2,4-dichloro-6-hydroxytriazine (potassium salt-sic).

(d) as c; however, the triazine salt is replaced by 0.49, 0.91 or 1.41 mmol of potassium ions (partly as the hydroxide, partly as the nitrate).

Coating solution containing a chromogenic color coupler:

100 g of a blue-sensitive solution batch, adjusted to pH 6.5, contain 5.55% of gelatine, 0.98 g of silver as a silver bromide emulsion, 2.3 g of yellow coupler which is introduced as an oil emulsion of the composition described below, 0.30 g of gellan gum and 2.7 mmol of potassium nitrate.

The coupler emulsion is prepared by the procedure described in German patent 2,716,204, Example 7. There are 3.0 kg of ethyl acetate, 250 g of tricresyl phosphate and 50 g of sodium isopropyl-naphthalinesulfonate per 1 kg of a yellow coupler of the formula

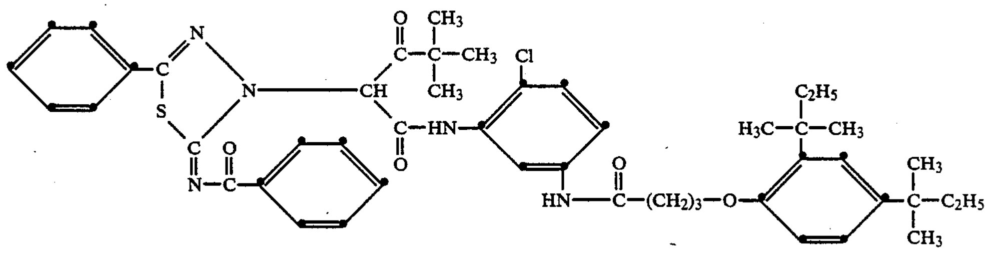

Coating solution for a black-and-white material:

100 g of a solution batch, adjusted to pH 6.0, contain 6.4 g of gelatine, 1.87 g of silver as a chlorobromide emulsion, 0.30 g of gellan gum as well as 60 mg of barium nitrate and 100 mg of 2,4-dichloro-6-hydroxytriazine (potassium salt).

The solutions mentioned are examined for their solidification behavior by the procedure described before. In all cases, the polysaccharide addition according to the invention effects an increase in the solidification temperature and additionally a marked shortening of the solidification time. A comparison of the solidification behavior of the coating solutions a and b according to the invention with that of the corresponding addition-free solutions (not according to the invention) shows: the solidification temperatures rise—depending on the gellan gum content-from 16° to 17° C. to values between 38° and 42° C. The cooling times are shortened from about 18 to 2-4 seconds. The solidification times are reduced from 7 (solution a) or 8 seconds (solution b) to less than 1 second.

Similar results are also obtained when the divalent metal salt is replaced by the triazine salt acting as a gelatine hardener or by another alkali metal salt (solutions c and d). For solution c, a solidification temperature of 40.3° C. is found, and temperatures of 35.7°, 38.4° and 40.3° C. are found for solutions d. A similar behavior is also observed in the case of the coating solution for the chromogenic process and for the black-and-white material.

EXAMPLE 10

Mottle reduction by using rapidly solidifying coating solutions.

Per square meter, 25.1 g of a base layer coating solution, 40.0 g of a magenta coating solution and 18.2 g of a protective layer coating solution are applied to a polyethylene-coated paper support. The solutions have the following composition: 100 g of base layer coating solution contain (a) 8.5 g of gelatine and 50 mg of barium nitrate in water (b) as a, but additionally also 0.3 g of gellan gum. 100 g of magenta coating solution contain (a) 6.0 g of gelatine, 0.52 g of silver as a stabilized, green-sensitized silver bromoiodide emulsion with 2.6 mol % of iodide, 402 mg of the magenta dye represented in Example 6 and 75 mg of barium nitrate (b) as a, but additionally also 0.25 g of gellan gum. 100 g of protective layer coating solution contain 8.5 g of gelatine and 590 mg of the potassium salt of 2,4-dichloro-6-hydroxytriazine.

The solidification temperature of the two coating solutions b according to the invention is 39.5° C.; all the other solutions solidify only at temperatures from 20° to 25° C. The uncoated support has an initial temperature of 23° C. and a calorimetrically determined heat capacity of 75 cal/m$^2$×°C. The total quantity of coating solution applied by cascade coating is 90 g/m$^2$. Its initial temperature is 45° C., and its heat capacity is 90 cal/m$^2$×°C. Under these conditions, a mixing temperature of 35° C. is established on coating: this is 4.5° C. below the solidification temperature of the solutions b and establishes itself virtually instantaneously due to the high thermal conductivities of the coating solutions and of the paper support, as can be verified by proximity temperature measurements directly after the coating station. As compared with gelatine solutions, the solutions according to the invention respond without delay to this jump in temperature, i.e. their gel strength immediately reaches finite values. For this reason, the two lower coating solutions in variant b solidify in the same form as immediately after application, whereas they distribute themselves, due to their low solidification temperature, unhindered across the irregularities of the support surface in the case of variant a, before the web has cooled to such an extent that the solidification can begin.

The two material variants are homogeneously exposed in the green spectral region and then subjected to the processing sequence described in Example 6. A mean color density of about 0.7 density units is obtained. In the case of variant a, pronounced magenta mottle is to be observed; in variant b, this mottle is only slightly distinctive.

EXAMPLE 11

Photographic behavior of layers according to the invention

The coating solutions a, b and d from Example 9 are, together with a suitable protective layern coating solution, coated onto a white-opaque support. 100 g of the protective layer coating solution contain 3.7 g of gelatine and 119 mg of the potassium salt of 2,4-dichloro-6-hydroxytriazine. Its pH is 6.5, and 40 g/m$^2$ are applied per unit area. The quantities of the dye-containing coating solutions applied are 50 (cyan) and 22 (yellow) and 40 g/m$^2$ (magenta).

The materials thus prepared are exposed behind a step wedge in the red (cyan), blue (yellow) and green spectral region (magenta), processed according to Example 6 and then measured sensitometrically. The resulting color density curves do not show any difference between the comparison layers and the layers according to the invention with added polysaccharide.

We claim:

1. A photographic material, which contains, on a support, at least one light-sensitive layer with gellan gum, which with mono-, di- and/or trivalent metal ions, forms gels having a solidification temperature between 24° and 45° C.

2. A photographic material as claimed in claim 1, which contains, on a support, at least one light-sensitive layer and at least one auxiliary layer, the auxiliary layer comprising gellan gum.

3. A photographic material as claimed in claim 2, which contains, on a support, at least one light-sensitive layer and at least one auxiliary layer, both the light-sensitive layer and the auxiliary layer comprising gellan gum.

4. A photographic material as claimed in claim 1, which contains, on a support, at least one light-sensitive layer, at least one layer containing a bleachable image dye and at least one auxiliary layer or at least one light-sensitive layer containing a bleachable image dye and at least one auxiliary layer, the auxiliary layer in each case comprising gellan gum.

5. A photographic material as claimed in claim 4, wherein the auxiliary layer is a base layer.

6. A process for increasing the solidification rate of a gelatine-containing photographic layer, which comprises using a coating solution which contains gellan gum.

7. A photographic material as claimed in claim 1, wherein the light-sensitive layer additionally contains ions of mono-, di- and/or tri-valent metals.

8. A photographic material as claimed in claim 1, wherein the light-sensitive layer additionally contains gelatine.

9. A photographic material as claimed in claim 8, wherein the gellan gum/gelatine ratio is 2:1 to 1:150.

10. A photographic material as claimed in claim 9, wherein the gellan gum/gelatine ratio is 2:1 to 1:70.

11. A photographic material as claimed in claim 10, wherein the gellan gum/gelatin ratio is 1:2 to 1:50.

12. A photographic material as claimed in claim 1, wherein the light-sensitive layer has a dry layer thickness from 0.05 to 2.00 $\mu$m.

13. A photographic material as claimed in claim 1, wherein the light-sensitive layer has a dry layer thickness from 0.05 to 1.00 μm.

14. A photographic material as claimed in claim 1, which is a silver dye bleach material.

15. A photographic material as claimed in claim 1, wherein the light-sensitive layer additionally contains a hardener.

16. A photographic material as claimed in claim 2, wherein the auxiliary layer additionally contains ions of mono-, di- and/or tri-valent metals.

17. A photographic material as claimed in claim 2, wherein the auxiliary layer additionally contains gelatine.

18. A photographic material as claimed in claim 17, wherein the gellan gum/gelatine ratio is 2:1 to 1:150.

19. A photographic material as claimed in claim 18, wherein the gellan gum/gelatine ration is 2:1 to 1:70.

20. A photographic material as claimed in claim 19, wherein the gellan gum/gelatine ratio is 1:2 to 1:50.

21. A photographic material as claimed in claim 2, wherein the auxiliary layer has a dry layer thickness from 0.05 to 2.00 μm.

22. A photographic material as claimed in claim 2, wherein the auxiliary layer has a dry layer thickness from 0.05 to 1.00 μm.

23. A photographic material as claimed in claim 2, wherein the auxiliary layer is a base layer.

24. A photographic material as claimed in claim 2, which is a silver dye bleach material.

25. A photographic material as claimed in claim 2, wherein the auxiliary layer additionally contains a hardener.

26. A photographic material as claimed in claim 2, wherein the auxiliary layer contains gellan gum and is a base layer in a silver dye bleach material.

* * * * *